(12) United States Patent
Folco et al.

(10) Patent No.: US 10,169,120 B2
(45) Date of Patent: Jan. 1, 2019

(54) REDUNDANT SOFTWARE STACK

(71) Applicant: International Business Machines Corporation, Armonk, NY (US)

(72) Inventors: Rafael C. S. Folco, Santa Barbara d'Oeste (BR); Breno H. Leitao, Araraquara (BR); Desnes A. Nunes do Rosario, Sao Paulo (BR); Jose F. Santiago Filho, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 20 days.

(21) Appl. No.: 15/192,070

(22) Filed: Jun. 24, 2016

(65) Prior Publication Data

US 2017/0371638 A1    Dec. 28, 2017

(51) Int. Cl.
*G06F 9/44* (2018.01)
*G06F 11/07* (2006.01)
*G06F 9/50* (2006.01)

(52) U.S. Cl.
CPC ............ *G06F 11/07* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 5,475,830 A * | 12/1995 | Chen | A21B 1/245 716/108 |
| 5,790,775 A | 8/1998 | Marks et al. | |
| 7,689,987 B2 | 3/2010 | Neil | |
| 7,847,801 B2 | 12/2010 | Qi | |
| 7,941,602 B2 | 5/2011 | Burkey | |
| 7,971,187 B2 | 6/2011 | Sanghvi et al. | |
| 8,495,412 B2 | 7/2013 | Pafumi et al. | |
| 8,650,328 B1 | 2/2014 | Chatterjee et al. | |
| 8,966,464 B1 | 2/2015 | Christopher et al. | |
| 2006/0277383 A1 | 12/2006 | Hayden et al. | |
| 2007/0174601 A1* | 7/2007 | Douglas | G06F 8/65 713/1 |
| 2010/0058012 A1* | 3/2010 | Okada | G06F 11/1456 711/162 |

(Continued)

OTHER PUBLICATIONS

Hardin, Ryan, "NetApp Host Multipath Strategy", NetApp, White paper, Jun. 2013 | WP-7135, © 2013 NetApp, Inc., 13 pages.

(Continued)

*Primary Examiner* — Chameli Das
(74) *Attorney, Agent, or Firm* — Christopher K. McLane

(57) ABSTRACT

The method includes identifying, by one or more computer processors, a first container with first software stack and a valid multipath configuration, wherein the first software stack is a first path of the valid multipath configuration. The method further includes creating, by one or more computer processors, a second container, wherein the second container has the same rules as the first container. The method further includes creating, by one or more computer processes, a second software stack in the second container, wherein the software stack is a redundant software stack of the first software stack. The method further includes creating, by one or more computer processors, a second path from the first container to the second software stack, wherein the second path bypasses the first software stack.

15 Claims, 3 Drawing Sheets

(56) References Cited

U.S. PATENT DOCUMENTS

| | | | | |
|---|---|---|---|---|
| 2011/0179188 A1* | 7/2011 | Nakagawa | ............ | G06F 3/0613 709/240 |
| 2012/0166748 A1* | 6/2012 | Satoyama | ............ | G06F 3/0608 711/165 |
| 2013/0107712 A1* | 5/2013 | Allan | ...................... | H04L 45/24 370/235 |
| 2014/0115674 A1* | 4/2014 | Fukushima | ............ | H04W 12/04 726/5 |
| 2014/0229676 A1* | 8/2014 | Biswas | ............... | G06F 12/0808 711/119 |
| 2015/0227375 A1* | 8/2015 | Mykland | ............. | G06F 15/7867 712/220 |
| 2015/0288767 A1* | 10/2015 | Fargano | .................. | H04L 43/08 709/227 |
| 2016/0050131 A1* | 2/2016 | Zhang | ................. | H04L 43/0811 370/244 |
| 2016/0170859 A1* | 6/2016 | Bucuvalas | .............. | G06F 8/433 717/132 |
| 2017/0134261 A1* | 5/2017 | Seo | ......................... | H04L 12/66 |
| 2017/0244781 A1* | 8/2017 | Walton | .................... | H04L 67/10 |

OTHER PUBLICATIONS

"Cisco SFS InfiniBand Redundancy Configuration Guide", Release 2.10, Dec. 2007, Cisco Systems, Inc. 170 West Tasman Drive, San Jose, CA 95134-1706, USA, © 2007 Cisco Systems, Inc., 118 pages.

"SIMATIC S7-300/S7-400 Software redundancy for SIMATIC S7", Function Manual, Apr. 2010, Siemens, Copyright © Siemens AG 2010, Siemens AG, Industry Sector, Postfach 48 48, 90026 Nürnberg, Germany, 118 pages.

* cited by examiner

REDUNDANT SOFTWARE STACK

BACKGROUND OF THE INVENTION

The present invention relates generally to software stacks, and more particularly to creating containers for multipath input/out.

Operating-system-level virtualization is a server virtualization method in which the kernel of an operating system allows the existence of multiple isolated user-space instances, instead of just one. Such instances, which are sometimes called software containers may look and feel like a real server from the point of view of its owners and users.

Operating-system-level virtualization is commonly used in virtual hosting environments, where it is useful for securely allocating finite hardware resources amongst a large number of mutually-distrusting users. System administrators may also use virtualization, to a lesser extent, for consolidating server hardware by moving services on separate hosts into containers on the one server.

Other typical scenarios include separating several applications to separate containers for improved security, hardware independence, and added resource management features. Operating-system-level virtualization implementations capable of live migration can also be used for dynamic load balancing of containers between nodes in a cluster.

SUMMARY

Aspects of the present invention disclose a method, computer program product, and system for creating redundant software stacks. The method includes identifying, by one or more computer processors, a first container with first software stack and a valid multipath configuration, wherein the first software stack is a first path of the valid multipath configuration. The method further includes creating, by one or more computer processors, a second container, wherein the second container has the same rules as the first container. The method further includes creating, by one or more computer processes, a second software stack in the second container, wherein the software stack is a redundant software stack of the first software stack. The method further includes creating, by one or more computer processors, a second path from the first container to the second software stack, wherein the second path bypasses the first software stack.

DETAILED DESCRIPTION

Embodiments of the present invention recognize that in computer storage, multipath input/output (I/O) is a fault-tolerance and performance-enhancement technique that defines more than one physical path between the central processing unit (CPU) in a computer system and its mass-storage devices through the buses, controllers, switches, and bridge devices connecting them. As an example, a small computer system interface (SCSI) hard disk drive may connect to two SCSI controllers on the same computer, or a disk may connect to two Fibre Channel ports. Should one controller, port or switch fail, the operating system can route the I/O through the remaining controller, port or switch transparently and with no changes visible to the applications, other than perhaps resulting in increased latency.

Embodiments of the present inventions also recognize multipath software layers can leverage the redundant paths to provide performance-enhancing features, including dynamic load balancing, traffic shaping, automatic path management, and dynamic reconfiguration. However, with multipath, the software is not redundant, (i.e., the physical path are redundant, but not the software stack). Software stack issues may cause all I/O to fail so that physical path redundancy is not helpful.

Implementation of embodiments of the invention may take a variety of forms, and exemplary implementation details are discussed subsequently with reference to the Figures.

Figure 1:
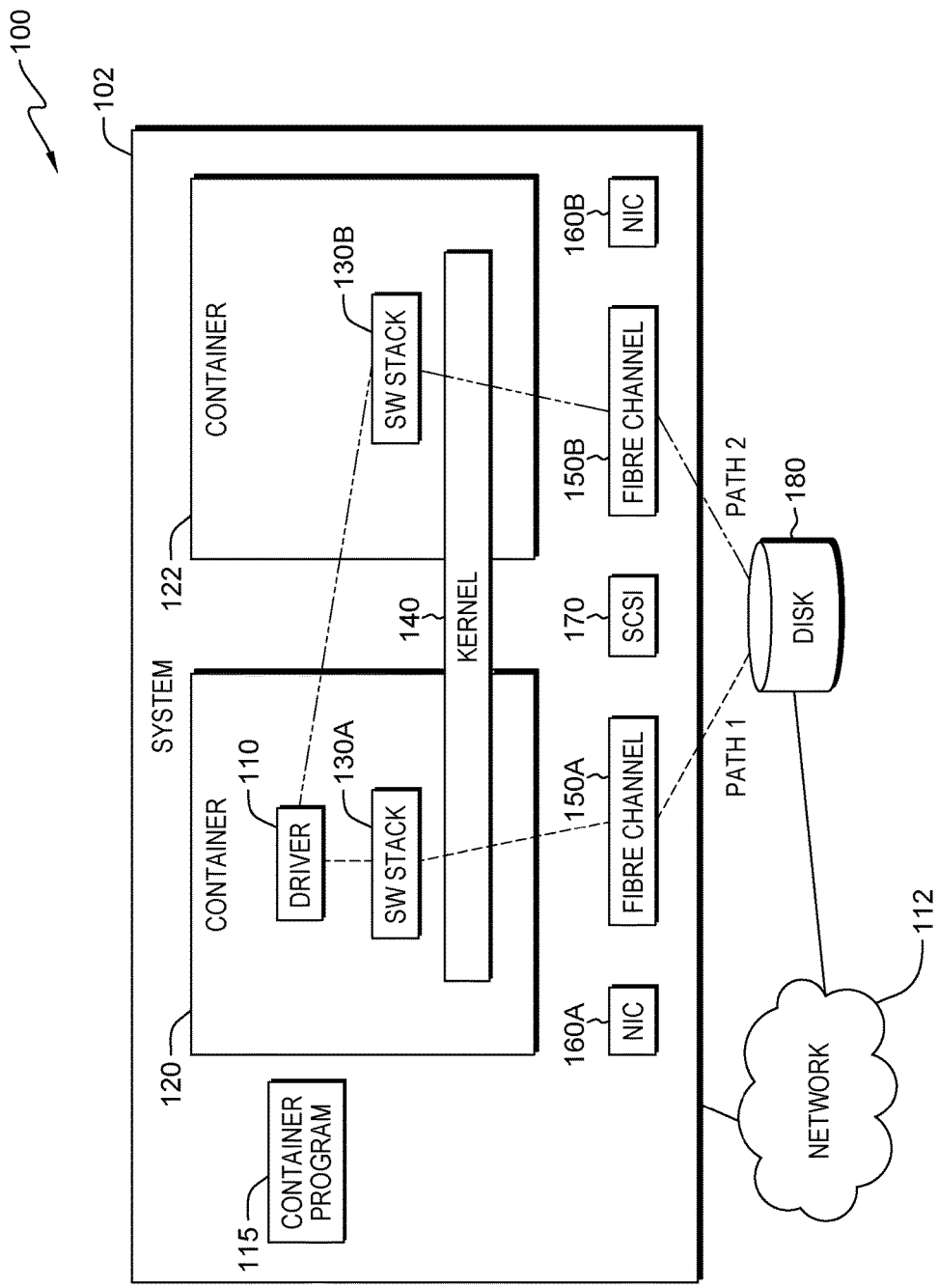
FIG. 1 is a functional block diagram illustrating a distributed data processing environment, in accordance with one embodiment of the present invention.

The present invention will now be described in detail with reference to the Figures. FIG. 1 is a functional block diagram of computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted environment, computing environment 100 includes system 102 and disk 180 connected to network 112. Network 112 may be a local area network (LAN), a wide area network (WAN), such as the Internet, a cellular data network, any combination thereof, or any combination of connections and protocols that will support communications between computing device, in accordance with embodiments of the invention. Network 112 may include wired, wireless, or fiber optic connections. Network 112 includes one or more wired and/or wireless networks that are capable of receiving and transmitting data, audio, and/or video signals, including multimedia signals that include audio, data, and video information. Computing environment 100 may include other devices not shown that are able to communicate with system 102 and disk 180 via network 112. Examples of other computing devices may include other computing system, disks, or any other device used in computing systems which are able to communicate or interact with the depicted items in computing environment 100.

In the depicted computing environment 100, system 102 may be any computing device, such as one or more servers, a desktop computer, a laptop computer, a tablet computer, a specialized computer server, a smart phone, any combination computer, or any programmable electronic device capable of sending and/or receiving digital information and communicating with disk 180 via network 112, path 1, path 2, or any other means, and with various components and devices within computing environment 100. In one embodiment, system 102 represent any computing device capable of executing machine readable program instructions and/or data storage as a standalone device or as used in conjunction with another electronic device via a network, such as network 112. System 102, as well as the programs and elements of system 102 are described further in FIG. 3.

In the depicted computing environment 100, container program 115 resides on system 102. In various embodiments, container program 115 identifies containers on system 102 and determines if the one or more identified containers contain a software stack for a multipath I/O. In an embodiment of a multipath I/O, a multipath I/O is a fault-tolerance and performance-enhancement technique that defines more than one physical path between the CPU in a computer system and the CUP's mass-storage devices through the buses, controllers, switches, and bridge devices connecting them. If container program 115 determines that the one or more identified containers contain a software stack with a multipath I/O, then container program 115 creates another container with an identical software stack as a failsafe with a separate path. Container program 115 is further depicted and described in FIG. 2.

In the depicted computing environment 100, container 120 located in system 102. In an example, a container is a class, a data structure, or an abstract data type (ADT) whose instances are collections of other objects. In other words, containers store objects in an organized way that follows specific access rules. The size of the container depends on the number of objects in the container. Underlying implementation of various container types may vary in space and time complexity, which provides flexibility in choosing the right implementation for a given scenario. In the depicted embodiment, container 120 contains software (SW) stack 130A and driver 110.

In the depicted computing environment 100, driver 110 is located in container 120. In various embodiments, driver 110 is a computer program that operates or controls a particular type of device that is attached to a computer. Driver 110 provides a software interface to hardware devices, enabling operating systems and other computer programs to access hardware functions without needing to know precise details of the hardware being used. Driver 110 communicates through a computer bus or communications subsystem to which the hardware connects. Driver 110 has multiple paths (i.e., multipath) for information to take between driver 110 and disk 180. In the depicted embodiment, two paths are shown, path 1 and path 2, and both paths originate at the driver and terminate at disk 180. Path 1 originates at driver 110, goes through SW stack 130A through fibre channel 150A and terminates at disk 180. Path 2 originates at driver 110, goes through SW stack 130B through fibre channel 150B and terminates at disk 180. The multipath I/O works like a traditional multipath with the addition of the container-ready protocol that enables communication between the container and the containers respective high availability layer. The multipath benefits from a shared memory reserved space as a communication channel between the container and the high availability container.

In the depicted computing environment 100, SW stack 130A is located in container 120. In various embodiments, SW stack 130A is a software stack that operates completely within the rules of container 120. In some embodiments, a software stack (e.g., SW stack 130A) is a set of software subsystems or components needed to create a complete platform such that no additional software is needed to support applications. Applications are said to "run on" or "run on top of" the resulting platform. Some definitions of a platform overlap with what is known as system software. For example, to develop an information technology (IT) solution, in the case of a web application, the architect defines the stack as the target operating system, web server, database, and programming language. In another example, a software stack is multiple items such as an operating system, middleware, database, and applications.

In the depicted computing environment 100, container 122 located in system 102. In an example, a container is a class, a data structure, or an abstract data type (ADT) whose instances are collections of other objects. In other words, they store objects in an organized way that follows specific access rules. The size of the container depends on the number of objects in the container. Underlying implementation of various container types may vary in space and time complexity, which provides flexibility in choosing the right implementation for a given scenario. In the depicted embodiment, container 122 contains SW stack 130B. In the depicted embodiment, container 122 is a lightweight and invisible high availability (HA) container. In various embodiments, container 122 cannot be accessed by a user as container 122 is intended to be invisible and not accessible externally. In various embodiments, the rules of container 122 are the same as the rules of container 120, as the software stack stored within the container have identical functions.

In the depicted computing environment 100, SW stack 130B is located in container 122. In various embodiments, SW stack 130B is a replica of SW stack 130A. In some embodiments, an exact copy of SW stack 130A is replicated in container 122 as SW stack 130B. In various embodiments, SW stack 130B is not utilized unless SW stack 130A has been corrupted. In other embodiments, SW stack 130B may be utilized to share the load on SW stack 130A. In a preferred embodiment, no changes to SW stack 130B will be implemented unless the same changes have already occurred on SW stack 130A and have been approved by a user, passed a compliance test, a previously set amount of time has elapsed (e.g., no malfunctions have occurred because of a change to SW stack 130A). In other embodiments, a SW stack 130B may only be upgraded if the main path reports success. In the case of a failure, the upgrade is reverted in container 122 and the incident is reported to the system administrator. In some embodiments, SW stack 130B may be different than SW stack 130A. In an example, SW stack 130A on path 1 has been upgraded, but SW stack 130B on path 2 has not been upgraded. Upon confirmation of a successful upgrade to SW stack 130A, SW stack 130B is upgraded to mirror SW stack 130A. If no confirmation of a successful upgrade to SW stack 130A is received then SW stack 130B stays as an older version and a notification may be sent to a system administrator.

In the depicted computing environment 100, kernel 140 resides on system 102. In various embodiments, a kernel (e.g., kernel 140) is a computer program that constitutes the central core of a computer's operating system. A kernel has complete control over everything that occurs in the system. A kernel (e.g., kernel 140) manages input/output requests from software, translating them into data processing instructions for the central processing unit. A kernel is also responsible for managing memory, and for managing and communicating with computing peripherals, like printers, speakers, etc. In some embodiments, kernel 140 is responsible for creating invisible HA containers (e.g., container 122) as backup containers.

In depicted computing environment 100 network interface controller (NIC) 160A and NIC 160B are located on system 102. In various embodiments, a NIC (e.g., NIC 160A and NIC 160B) implements the electronic circuitry required to communicate using a specific physical layer and data link layer standard such as Ethernet, Fibre Channel, Wi-Fi or Token Ring. The implementation provides a base for a full network protocol stack, allowing communication among small groups of computers on the same local area network (LAN) and large-scale network communications through routable protocols, such as Internet Protocol (IP). The NIC allows computers to communicate over a computer network, either by using cables or wirelessly.

In the depicted computing environment 100, fibre channel 150A and fibre channel 150B are located on system 102. In some embodiments, a fibre channel is a high-speed network technology, commonly running at 1, 2, 4, 8, 16, and 32 gigabit per second rates, primarily used to connect computer data storage to servers. A fibre channel is primarily used in storage area networks (SAN) in enterprise storage. A fibre channel network is known as a fabric because multiple fiber channels may operate in unison as one big switch. In the depicted embodiments, fibre channel 150A is utilized by container 120, and fibre channel 150B is utilized by container 122.

In the depicted computing environment 100, small computer system interface (SCSI) 170 is located on system 102. In some embodiments, a SCSI (e.g., SCSI 170) is a set of standards for physically connecting and transferring data between computers and peripheral devices. The SCSI standards define commands, protocols, electrical and optical interfaces. An SCSI is most commonly used for hard disk drives and tape drives, but it can connect a wide range of other devices, including scanners and CD drives.

In the depicted computing environment 100, disk 180 is a standalone data storage device. In some embodiments, disk 180 may be located within a computing device, or distributed over various computing devices. Disk 180 may be a repository that may be written to and/or read by system 102 and/or programs and internal devices of system 102, or users of system 102. In some embodiments, disk 180 may be written to and read by programs and entities outside of computing environment 100.

Disk 180 may be implemented using any volatile or non-volatile storage media for storing information, as known in the art. For example, disk 180 may be implemented with a tape library, optical library, one or more independent hard disk drives, multiple hard disk drives in a redundant array of independent disks (RAID), solid-state drives (SSD), or random-access memory (RAM). Similarly, disk 180 may be implemented with any suitable storage architecture known in the art, such as a relational database, an object-oriented database, or one or more tables.

Figure 2:
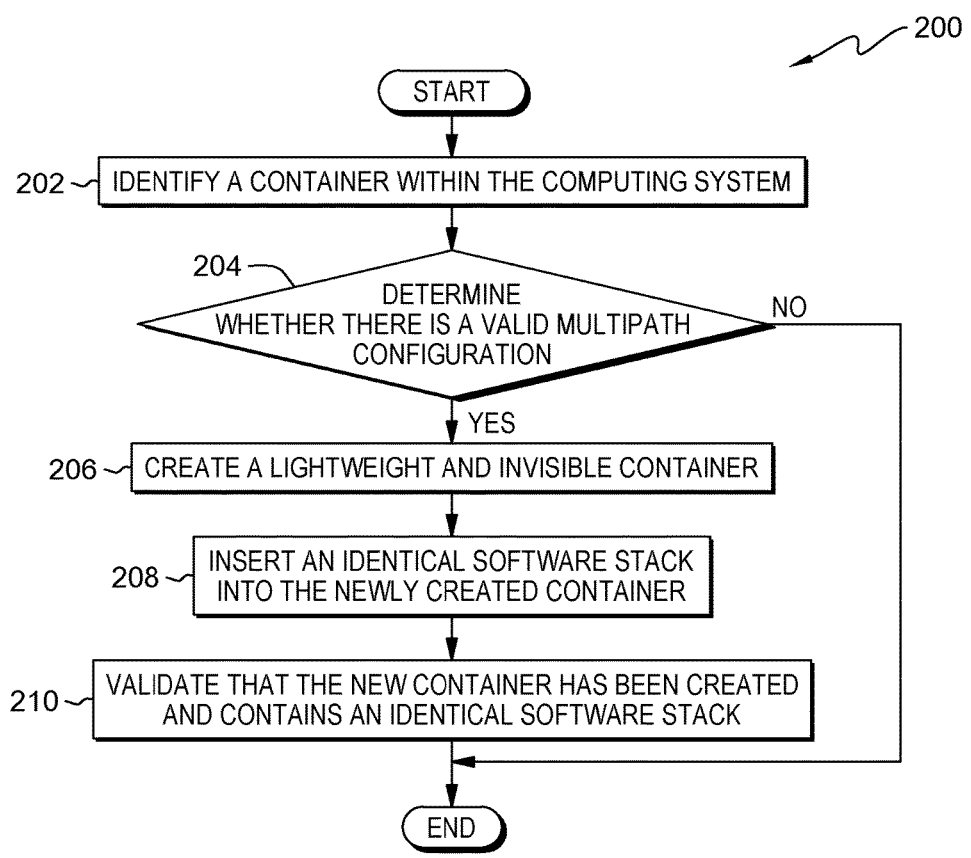
FIG. 2 depicts a flowchart depicting operational steps of creating a redundant software stack utilizing containers, executing within the computing system of FIG. 1, in accordance with one embodiment of the present invention.

FIG. 2 is a flowchart depicting operational steps of program 200, which is a function of container program 115, in accordance with an embodiment of the present invention. The steps of program 200 may happen in another order. Some steps depicted in FIG. 2 may be skipped and other steps may be added. In some embodiments, the operational steps of program 200 may continuously loop. In other embodiments, the operational steps of program 200 begin in response to a user activating program 200. In some embodiments, a user may have preset timeframes for program 200 to begin, such as between specific hours of a day.

Program 200 identifies a container within the computing system (step 202). In various embodiments, program may receive a notification each time a container (e.g., container 120) is created. In other embodiments, program 200 may search a computing system for one or more containers. In the depicted embodiment, a path leads from the driver in container 120 to the software stack located within the container (e.g., SW stack 130A) and then out of the container to fibre channel 150A and finally to disk 180.

Program 200 determines whether there is a valid multipath configuration (decision 204). In various embodiments, program 200 determines if the identified container from step 202 has a valid multipath configuration. Program 200 may search the code of the identified container to determine if the code utilizes multipath, or any other method known by one skilled in the art. If the container does not have a valid multipath configuration, then program 200 goes to end (no branch, decision 204). In another embodiment, program 200 may revert back to step 202 and identify another container. If program 200 identifies that the container (e.g., container 120) has a valid multipath configuration, program too proceeds to step 206.

Program 200 creates a lightweight and invisible container (step 206). In various embodiments, program 200 creates a new container (e.g., container 122). Program 200 identifies the rules for the container identified in step 202 and utilizes the same rules for the newly created container. In some embodiments, program 200 also includes rules to make the new container invisible (i.e., the container is not accessible to a user of system 102). In an example, by making the container invisible to a user of system 102, program 200 protects container from modifications to the container and any items, programs, elements, etc. located within the container. In various embodiments, program 200 does not create the container, but rather sends instructions to a kernel (e.g., kernel 140) to create the new container. In a preferred embodiment, the newly created container is a High Availability (HA) container. In various examples, container 122 and the contents of container 122 are not modified until verification of any modification to the related container (e.g., 120) have been tested and validated.

In various embodiments, the container multipath I/O works like a traditional multipath with the addition of the container-ready protocol that enables communication between the container and it's respective HA layer. The protocol benefits from a shared memory reserved space as a communication channel between the first identified container of step 202 (e.g., container 120) and the newly created HA container (e.g., container 122).

Program 200 inserts an identical software stack into the newly created container (step 208). In various embodiments, program 200 copies the one or more software stacks located in first identified container (e.g., container 120) and inputs the same software stacks in the newly created container (e.g., container 122). In some embodiments, a program 200 may only select one of multiple software stacks within a container to input in the newly created container. In other embodiments, each software stack located within the first identified container will have a separate lightweight and invisible container created. In the depicted embodiment, program 200 sends instructions to route a path (e.g., path 2) from the driver (driver 110) in the first container (container 120) to the software stack (e.g., SW stack 130B) of the new container (e.g., container 122) then through a fibre channel (e.g., fibre channel 150B) and finally to the disk (e.g., disk 180).

Program 200 validates that the new container has been created and contains an identical software stack (step 210). In various embodiments, program 200 checks to determine if the newly created container, software stack, and path is functioning properly. For example, program 200 may query the multipath to determine the status. An example query may look like:

```
#multipath -II
mpatha
    \sda         active [OK]
    \sda-ha      creating...
```
In another example, the query may look like:
```
#multipath -II
mpatha
    \sda         active [OK]
    \sda-ha      active [OK]
```

In various embodiments, program 200 may continue to validate both the new container and the original container. If the query indicates a problem (e.g., an error) occurs in the original container, (e.g., container 120), then program 200 may route from the original path and software stack (e.g., path 1 and SW stack 130A) to the copied software stack and second path (e.g., SW stack 130B and path 2). Program 200 may continue to query both paths to determine if they are operational. Errors may occur for various reasons such as dependency breakages, upgrades, a wrong configuration, bugs, leaks, etc. An example query may look like:

```
#multipath- II
mpatha
    \sda         failure [ERROR]
    \sda-ha      active [OK]
```

In some embodiments, upgrades in the software stack may occur in the newly created container (e.g., SW stack 130B), but only if the main path (e.g., path 1) has reported success. If a failure occurs in the main path (e.g., path 1), the upgrade does not proceed in the newly created container (e.g., container 122) and the failure is reported to a system administrator. In this case, the redundant path (e.g., path 2) will take over until the main path (e.g., path 1) recovers. In other embodiments, program 200 directs use of both paths without a failure as a method of load balancing. For example, path 1 is lagging because there is too much data, therefore, an algorithm is implement to split the data traffic between the two paths (e.g., 100 bytes to each path in a round robin method). In this way, the load is balanced between two paths and reduces lag.

Figure 3:
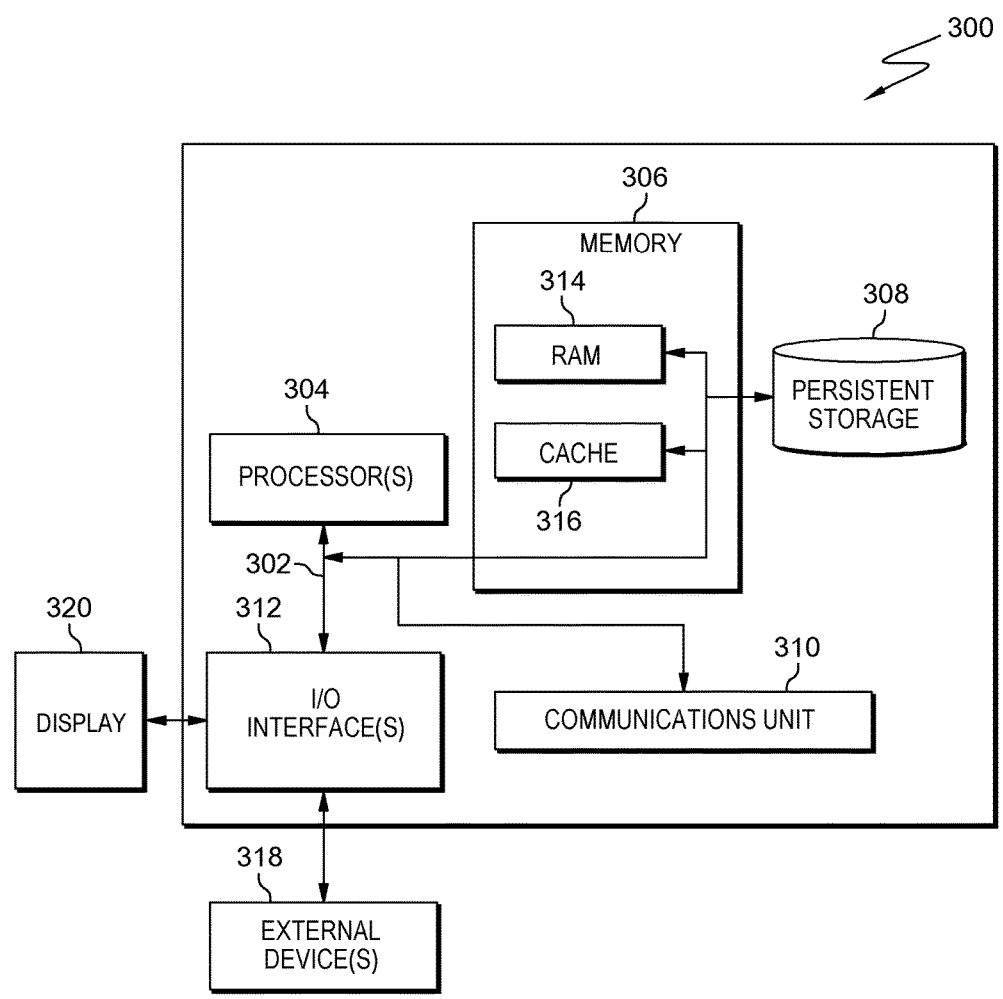
FIG. 3 depicts a block diagram of components of the server and/or the computing device of FIG. 1, in accordance with another embodiment of the present invention.

FIG. 3 depicts a block diagram of components of computing device 300 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 406 includes random access memory (RAM) 314. In general, memory 306 can include any suitable volatile or non-volatile computer readable storage media. Cache 316 is a fast memory that enhances the performance of computer processor(s) 304 by holding recently accessed data, and data near accessed data, from memory 306.

Container program 115, containers 120 and 122, SW stacks 130A and 130B, and disk 180 may be stored in persistent storage 308 and in memory 306 for execution and/or access by one or more of the respective computer processor(s) 304 via cache 316. In an embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Container program 115, containers 120 and 122, SW stacks 130A and 130B, and disk 180 may be downloaded to persistent storage 308 through communications unit 310.

I/O interface(s) 312 allows for input and output of data with other devices that may be connected to computing device 300. For example, I/O interface(s) 312 may provide a connection to external device(s) 318, such as a keyboard, a keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., container program 115, containers 120 and 122, SW stacks 130A and 130B, and disk 180, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating redundant software stacks, the method comprising:

identifying, by one or more computer processors, a first container with a set of rules and with first software stack and a valid multipath configuration, wherein the first software stack is a first path of the valid multipath configuration;

creating, by one or more computer processors, a second container, wherein the second container has the same set rules as the first container;

creating, by one or more computer processes, a second software stack in the second container, wherein the second software stack is a redundant software stack of the first software stack;

creating, by one or more computer processors, a second path from the first container to the second software stack, wherein the second path bypasses the first software stack;

identifying, by one or more computer processors, a data load on the first path that is creating latency; and sending, by one or more computer processors, at least a portion of the data load on the first path to the second path to reduce the latency on the first path.

2. The method of claim 1, further comprising:
receiving, by one or more computer processors, a status of the second path indicating that the second container and the second path is being created.

3. The method of claim 1, further comprising:
receiving, by one or more computer processors, a status of the second path indicating that the second contain container and the second path is active.

4. The method of claim 1, further comprising:
querying, by one or more computer processors, a status of the first path and a status of the second path;
receiving, by one or more computer processors, an indication that a problem has occurred with the first software stack from the first path; and
confirming, by one or more computer processors, that the status of the second path remains active.

5. The method of claim 1, further comprising:
upgrading, by one or more computer processors, the first software stack;
receiving, by one or more computer processors, an indication that the upgrade to the first software stack is successful; and
in response to receiving an indication of a successful upgrade, upgrading, by one or more computer processors, the second software stack.

6. A computer program product for creating redundant software stacks, the computer program product comprising:
one or more computer readable storage media and program instructions stored on the one or more computer readable storage media, the program instructions comprising:
program instructions to identify a first container with a set of rules and with first software stack and a valid multipath configuration, wherein the first software stack is a first path of the valid multipath configuration;
program instructions to create a second container, wherein the second container has the same rules as the first container;
program instructions to create a second software stack in the second container, wherein the second software stack is a redundant software stack of the first software stack;
program instructions to create a second path from the first container to the second software stack, wherein the second path bypasses the first software stack;
identify a data load on the first path that is creating latency; and
send at least a portion of the data load on the first path to the second path to reduce the latency on the first path.

7. The computer program product of claim 6, further comprising program instructions to:
receive a status of the second path indicating that the second container and the second path is being created.

8. The computer program product of claim 6, further comprising program instructions to:
receive a status of the second path indicating that the second contain container and the second path is active.

9. The computer program product of claim 6, further comprising program instructions to:
query a status of the first path and a status of the second path;
receive an indication that a problem has occurred with the first software stack from the first path; and
confirm that the status of the second path remains active.

10. The computer program product of claim 6, further comprising program instructions to:
upgrade the first software stack;
receive an indication that the upgrade to the first software stack is successful; and
in response to receiving an indication of a successful upgrade, upgrade the second software stack.

11. A computer system for creating redundant software stacks, the computer system comprising:
one or more computer processors;
one or more computer readable storage media;
program instructions stored on the computer readable storage media for execution by at least one of the one or more computer processors, the program instructions comprising:
program instructions to identify a first container with a set of rules and with first software stack and a valid multipath configuration, wherein the first software stack is a first path of the valid multipath configuration;
program instructions to create a second container, wherein the second container has the same rules as the first container;
program instructions to create a second software stack in the second container, wherein the second software stack is a redundant software stack of the first software stack;
program instructions to create a second path from the first container to the second software stack, wherein the second path bypasses the first software stack;
identify a data load on the first path that is creating latency; and
send at least a portion of the data load on the first path to the second path to reduce the latency on the first path.

12. The computer system of claim 11, further comprising program instructions to:
receive a status of the second path indicating that the second container and the second path is being created.

13. The computer system of claim 11, further comprising program instructions to:
receive a status of the second path indicating that the second container and the second path is active.

14. The computer system of claim 11, further comprising program instructions to:
query a status of the first path and a status of the second path;
receive an indication that a problem has occurred with the first software stack from the first path; and
confirm that the status of the second path remains active.

15. The computer system of claim 11, further comprising program instructions to:
  upgrade the first software stack;
  receive an indication that the upgrade to the first software stack is successful; and
  in response to receiving an indication of a successful upgrade, upgrade the second software stack.

\* \* \* \* \*